United States Patent
Hashimoto

(10) Patent No.: US 11,381,416 B2
(45) Date of Patent: Jul. 5, 2022

(54) APPLIANCE CONTROL SYSTEM AND SERVER

(71) Applicant: Mitsubishi Electric Corporation, Tokyo (JP)

(72) Inventor: Kentaro Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/287,554

(22) PCT Filed: Nov. 30, 2018

(86) PCT No.: PCT/JP2018/044290
§ 371 (c)(1),
(2) Date: Apr. 22, 2021

(87) PCT Pub. No.: WO2020/110312
PCT Pub. Date: Jun. 4, 2020

(65) Prior Publication Data
US 2021/0385103 A1    Dec. 9, 2021

(51) Int. Cl.
*G06F 15/177* (2006.01)
*H04L 12/28* (2006.01)

(52) U.S. Cl.
CPC ...... *H04L 12/2814* (2013.01); *H04L 12/2827* (2013.01)

(58) Field of Classification Search
CPC .................. H04L 12/2814; H04L 12/2827
See application file for complete search history.

(56) References Cited

U.S. PATENT DOCUMENTS

| 2018/0163758 | A1  | 6/2018  | Fauchery et al. |
| 2018/0164758 | A1* | 6/2018  | Liu ............... H04L 67/125 |
| 2020/0406771 | A1* | 12/2020 | Okumura ........... B60L 55/00 |

FOREIGN PATENT DOCUMENTS

| CN | 105933188 A  | * 9/2016 |
| JP | 2005-252770 A | 9/2005 |

(Continued)

OTHER PUBLICATIONS

International Search Report of the International Searching Authority dated Dec. 25, 2018 for the corresponding international application No. PCT/JP2018/044290 (and English translation).

(Continued)

*Primary Examiner* — Richard G Keehn
(74) *Attorney, Agent, or Firm* — Posz Law Group, PLC

(57) ABSTRACT

Based on home appliance information, network communication device identification information, and usage condition information of a home electric appliance, the server selects software for the network communication device corresponding to a home electric appliance from among a multiple pieces of software having a one-to-one relation with different types of a plurality of home electric appliances stored in a server storage unit, and transmits the software to the network communication device, the home appliance information being information with which the home electric appliance is identifiable, the network communication device identification information being information with which the network communication device is uniquely identifiable, the usage condition information being information on a usage environment and a usage function of the home electric appliance. The network communication device updates the software for the network communication device stored in the network communication device with the software transmitted from the server.

7 Claims, 11 Drawing Sheets

(56) References Cited

FOREIGN PATENT DOCUMENTS

| JP | 2010-251824 | A | | 11/2010 | |
| --- | --- | --- | --- | --- | --- |
| JP | 2014-222468 | A | | 11/2014 | |
| JP | 2015-142255 | A | | 8/2015 | |
| JP | 2016-143318 | A | | 8/2016 | |
| JP | 2018-006800 | A | | 1/2018 | |
| JP | 2018006800 | A | * | 1/2018 | |
| JP | 2018-116349 | A | | 7/2018 | |
| RU | 2681466-02 | | * | 3/2019 | ............ G06F 9/451 |

OTHER PUBLICATIONS

Office Action dated Jan. 11, 2022 issued in corresponding JP Application No. 2020-557524 (and English translation).
Office Action dated Feb. 23, 2022, issued in corresponding Australian patent application No. 2018451481.

* cited by examiner

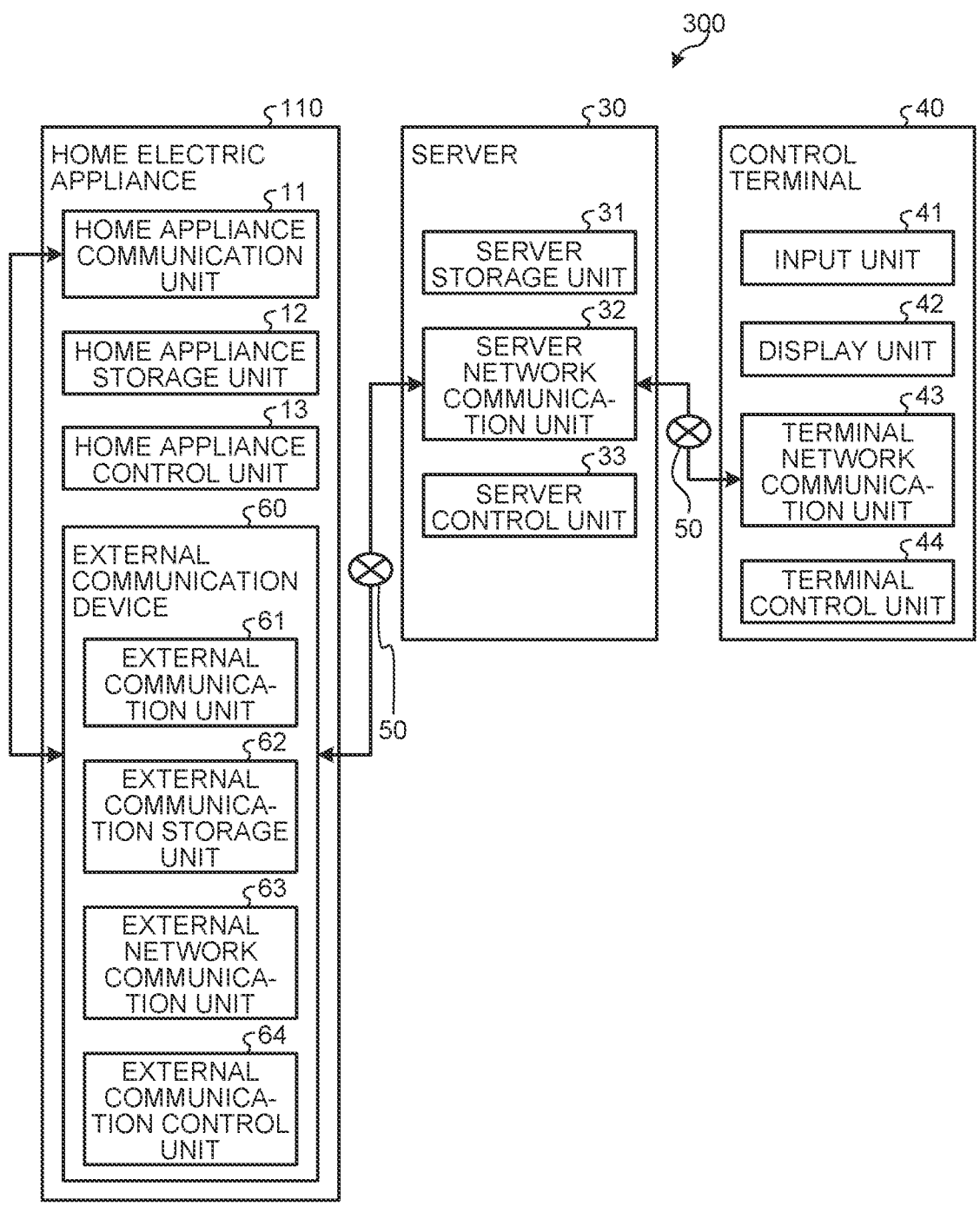

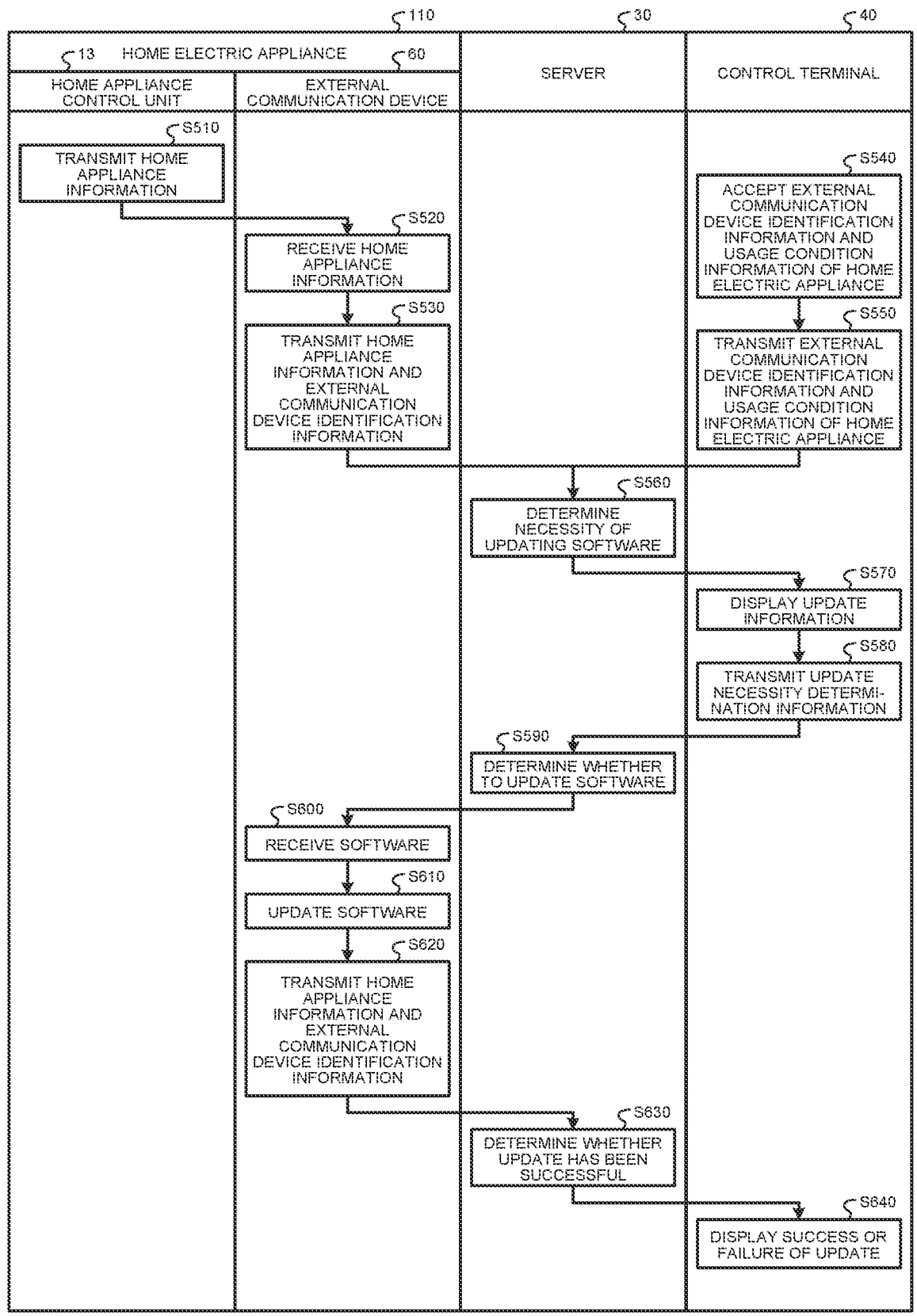

APPLIANCE CONTROL SYSTEM AND SERVER

CROSS REFERENCE TO RELATED APPLICATION

This application is a U.S. national stage application of International Patent Application No. PCT/JP2018/044290 filed on Nov. 30, 2018, the disclosure of which is incorporated herein by reference.

TECHNICAL FIELD

The present invention relates to a device control system capable of remotely controlling a home electric appliance that is a device to be controlled using a control device, and to a communication adapter and a home electric appliance.

BACKGROUND

Conventional techniques are proposed for transmitting software stored in a server to a home electric appliance via a network to update the software stored in the home electric appliance. For example, devices that connect to a network, such as smartphones and game devices, can be updated with software for purposes such as expansion of functions or correction of defects.

In the communication system described in Patent Literature 1, hardware configuration information, i.e. information about a communication adapter as a network communication device, is transmitted from the communication adapter to the server via a mobile terminal. Based on the hardware configuration information, the server determines the necessity of transmitting an updated software module to the communication adapter and, if necessary, transmits the updated software module to the communication adapter.

PATENT LITERATURE

Patent Literature 1: Japanese Patent Application Laid-open No. 2014-222468

However, in the communication system described in Patent Literature 1, the server cannot determine the necessity of transmitting an updated software module to the communication adapter by any factor other than the hardware configuration information. For this reason, for example, software update of the network communication device cannot be implemented in a manner that does not depend on the hardware configuration and that reflects the appliance-specific usage condition as an update execution condition, such as information on specifications specific to an appliance for a particular user and information on whether there is a function specific to a particular appliance, which is problematic.

SUMMARY

The present invention has been made in view of the above, and an object thereof is to obtain a device control system capable of updating the software of a network communication device by reflecting the appliance-specific usage condition as an update execution condition.

A device control system according to an aspect of the present invention includes: a home electric appliance; a control terminal that remotely controls the home electric appliance; a server that distributes software, the server being capable of network communication with the control terminal; and a network communication device communicable with the home electric appliance, and operable based on the software acquired from the server by communicating with the server. The server includes a server storage unit that stores multiple different pieces of the software for the network communication device, the multiple different pieces of software having a one-to-one relation with different types of a plurality of home electric appliances including the home electric appliance. Based on home appliance information, network communication device identification information, and usage condition information of the home electric appliance, the server selects the software for the network communication device corresponding to the home electric appliance from among the multiple pieces of software stored in the server storage unit, and transmits the software to the network communication device, the home appliance information being information with which the home electric appliance is identifiable, the network communication device identification information being information with which the network communication device is uniquely identifiable, the usage condition information being information on a usage environment and a usage function of the home electric appliance. The network communication device updates the software for the network communication device stored in the network communication device with the software for the network communication device transmitted from the server.

The device control system according to the present invention can achieve the effect of updating the software of the communication adapter by reflecting the appliance-specific usage condition as an update execution condition.

BRIEF DESCRIPTION OF DRAWINGS

FIG. 10 is a diagram illustrating an exemplary configuration of a device control system according to a fourth embodiment of the present invention.

FIG. 11 is a diagram illustrating the procedure for updating the firmware of an external communication device in the device control system illustrated in FIG. 10.

DETAILED DESCRIPTION

Hereinafter, a device control system, a communication adapter, and a home electric appliance according to embodiments of the present invention will be described in detail with reference to the drawings. The present invention is not limited to the embodiments.

First Embodiment

Figure 1:
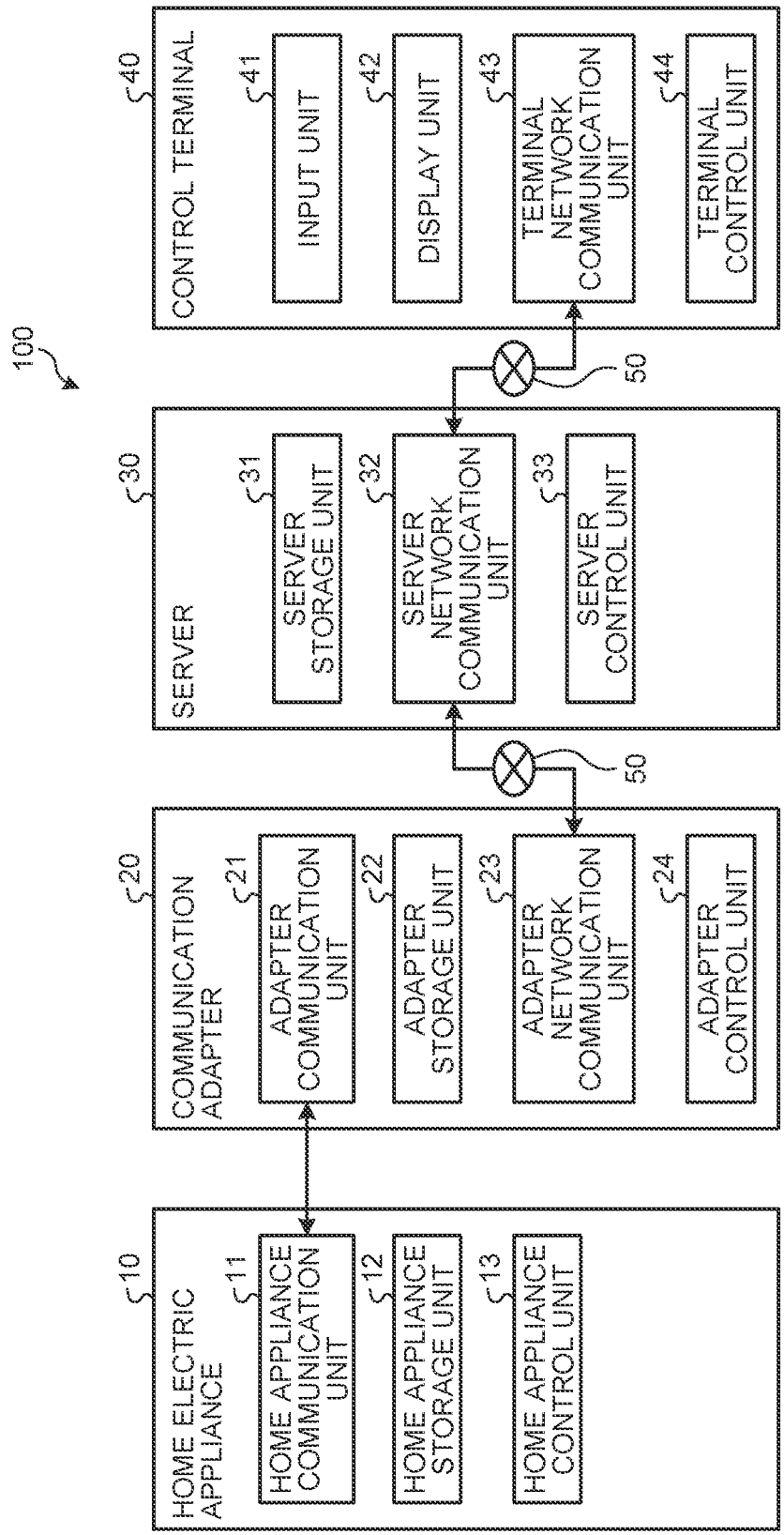
FIG. 1 is a diagram illustrating an exemplary configuration of a device control system according to a first embodiment of the present invention.

FIG. 1 is a diagram illustrating an exemplary configuration of a device control system 100 according to the first embodiment of the present invention. The device control system 100 according to the first embodiment includes a home electric appliance 10 that is a device to be controlled, a communication adapter 20 that is connected to the home electric appliance 10, a server 30 that communicates with the communication adapter 20, and a control terminal 40 that communicates with the server 30.

The device control system 100 is a device control system capable of remotely controlling the home electric appliance 10 that is a device to be controlled using the control terminal 40 as a control device via the communication adapter 20 and the server 30. In the device control system 100, the user can remotely control the home electric appliance 10 from inside or outside the house using the control terminal 40. The home electric appliance 10 is an example of a device to be controlled.

The home electric appliance 10 includes a home appliance communication unit 11, a home appliance storage unit 12, and a home appliance control unit 13. Each component in the home electric appliance 10 can send and receive information.

The home appliance communication unit 11 performs wired communication with the communication adapter 20. Note that the home appliance communication unit 11 may perform wireless communication with the communication adapter 20.

The home appliance storage unit 12 stores software for controlling the home electric appliance 10 and information for controlling the home electric appliance 10. The home appliance storage unit 12 stores home appliance information, i.e. information on the home electric appliance 10 with which the home electric appliance 10 is identifiable. The home appliance information includes, for example, information on the type of home electric appliance, information on the functionality of the home electric appliance, information on the model name of the home electric appliance, information on the version of the software stored in the home electric appliance, and information on the date of production of the home electric appliance. An example of the type of home electric appliance is an air conditioner. An example of the functionality of the home electric appliance is a cooling-dedicated function.

The home appliance control unit 13 controls the entire home electric appliance 10. When the home electric appliance 10 is turned on, the home appliance control unit 13 causes the home appliance communication unit 11 to transmit the home appliance information stored in the home appliance storage unit 12 to the communication adapter 20.

Figure 2:
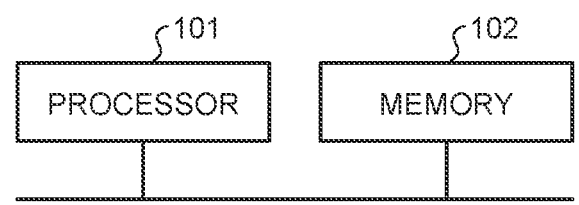
FIG. 2 is a diagram illustrating an exemplary hardware configuration of processing circuitry according to the first embodiment of the present invention.

The home appliance control unit 13 is implemented, for example, as processing circuitry with the hardware configuration illustrated in FIG. 2. FIG. 2 is a diagram illustrating an exemplary hardware configuration of the processing circuitry according to the first embodiment of the present invention. In a case where the home appliance control unit 13 is implemented by the processing circuitry illustrated in FIG. 2, the home appliance control unit 13 is implemented by a processor 101 executing a program stored in a memory 102 illustrated in FIG. 2, for example. A plurality of processors and a plurality of memories may cooperate to implement the above functions. Some of the functions of the home appliance control unit 13 may be embodied as an electronic circuit, and the other functions may be implemented using the processor 101 and the memory 102.

Similarly, the home appliance communication unit 11 may be configured to be implemented by the processor 101 executing a program stored in the memory 102. The processor and memory for implementing the home appliance communication unit 11 may be the same as or different from the processor and memory for implementing the home appliance control unit 13.

The communication adapter 20 is a network adapter as a network communication device that is used in connection with the home electric appliance 10 in order to add a network communication function to the home electric appliance 10. The communication adapter is communicable with the home electric appliance 10, and operable based on the software acquired from the server 30 by directly or indirectly communicating with the server 30. The communication adapter 20 includes an adapter communication unit 21, an adapter storage unit 22, an adapter network communication unit 23, and an adapter control unit 24. Each component in the communication adapter 20 can send and receive information.

The adapter communication unit 21 performs wired communication with the home electric appliance 10. Note that the adapter communication unit 21 may perform wireless communication with the home electric appliance 10. The adapter communication unit 21 receives the home appliance information transmitted from the home electric appliance 10 and transmits the home appliance information to the adapter control unit 24.

The adapter storage unit 22 stores software for controlling the communication adapter 20 and information for controlling the communication adapter 20. The adapter storage unit 22 stores a media access control (MAC) address, i.e. a physical address for network communication uniquely assigned to the communication adapter 20. The MAC address is a unique identification number attached to the network adapter. The adapter storage unit 22 also stores an identification (ID) assigned to the adapter storage unit 22 to identify the user of the device control system 100. The ID is determined at the time of production of the communication adapter 20. The MAC address and the ID are adapter identification information, i.e. identification information with which the communication adapter 20 is uniquely identifiable. The adapter identification information is network communication device identification information, i.e. identification information with which the network communication device is uniquely identifiable.

The user can read the MAC address value and the ID value from the adapter storage unit 22 to, for example, an external display device so as to check the MAC address value and the ID value. The MAC address value and the ID value may be described on the outer shell of the communication adapter, or a document describing the MAC address value and the ID value may be separately attached to the communication adapter 20.

The adapter network communication unit 23 can perform network communication with the server 30 and the control terminal 40 via an Internet network 50. The adapter network communication unit 23 can perform wireless communication with the server 30 and the control terminal 40. Note that the adapter network communication unit 23 may perform wired communication with the server 30 and the control terminal 40.

The adapter control unit 24 controls the entire communication adapter 20. When the communication adapter 20 is turned on, the adapter control unit 24 causes the adapter network communication unit 23 to transmit, to the communication adapter 20, the MAC address and the ID, which are first identification information stored in the adapter storage unit 22, and the home appliance information received from the home electric appliance 10.

The adapter control unit 24 is implemented, for example, as processing circuitry with the hardware configuration illustrated in FIG. 2, like the home appliance control unit 13. Similarly, the adapter communication unit 21 and the adapter network communication unit 23 may be configured to be implemented by the processor 101 executing a program stored in the memory 102. The processor and memory for implementing each of the adapter communication unit 21 and the adapter network communication unit 23 may be the same as or different from the processor and memory for implementing the adapter control unit 24.

The server 30 is a cloud server that communicates with other devices and distributes software via the Internet network 50, and includes a server storage unit 31, a server network communication unit 32, and a server control unit 33. Each component in the server 30 can send and receive information.

The server storage unit 31 stores software for controlling the server 30 and information for controlling the server 30. The server storage unit 31 can store multiple pieces of software for multiple types of home electric appliances and multiple pieces of software for multiple types of communication adapters. Software for home electric appliances is software for operating home electric appliances. Software for communication adapters is software for operating communication adapters.

The server network communication unit 32 performs network communication with the communication adapter 20 and the control terminal 40 via the Internet network 50. The server network communication unit 32 can perform wireless communication with the communication adapter 20 and the control terminal 40. Note that the adapter network communication unit 23 may perform wired communication with the communication adapter 20 and the control terminal 40.

The server control unit 33 controls the entire server 30. The server control unit 33 transmits, to the home electric appliance 10 via the communication adapter 20, an operation instruction for the home electric appliance 10 transmitted from the control terminal 40. That is, the server control unit 33 derives the relationship between the communication adapter 20 and the control terminal 40 based on the MAC address and ID received from the communication adapter 20 and the control terminal 40, so that operations from the control terminal 40 can be transferred to the communication adapter. In addition, the server control unit 33 selects appropriate software for the communication adapter 20 based on the information transmitted from the communication adapter 20 and the control terminal 40, and distributes the software to the communication adapter 20.

The server control unit 33 is implemented, for example, as processing circuitry with the hardware configuration illustrated in FIG. 2, like the home appliance control unit 13. Similarly, the server network communication unit 32 may be configured to be implemented by the processor 101 executing a program stored in the memory 102. The processor and memory for implementing the server network communication unit 32 may be the same as or different from the processor and memory for implementing the server control unit 33.

The control terminal 40 is a control device capable of remotely controlling the home electric appliance 10 by transmitting an operation instruction for the home electric appliance 10 to the home electric appliance 10 via the server 30 and the communication adapter 20. The control terminal 40 can be a mobile terminal such as a smartphone or a dedicated terminal device. The control terminal 40 includes an input unit 41, a display unit 42, a terminal network communication unit 43, and a terminal control unit 44. Each component in the control terminal 40 can send and receive information.

The input unit 41 is an interface for remotely controlling the operation of the home electric appliance 10, and accepts instruction information related to the operation of the home electric appliance 10 from the user. The input unit 41 also accepts information for updating the software of the home electric appliance 10 and the communication adapter. The input unit 41 is configured to allow the user to freely select various functions related to the operation of the home electric appliance 10, such as starting and stopping the operation of the home electric appliance 10, selecting the operation mode of the home electric appliance 10, setting the operation intensity, and setting the timer. The input unit 41 transmits various information accepted to the terminal control unit 44. The input unit 41 is implemented by an input device such as a touch panel, for example.

The display unit 42 displays various information accepted by the input unit 41 so as to notify the user. The display unit 42 is implemented by a liquid crystal display device, for example.

The terminal network communication unit 43 can perform network communication with the server 30 and the communication adapter 20 via the Internet network 50. The terminal network communication unit 43 can perform wireless communication with the server 30 and the communication adapter 20. Note that the terminal network communication unit 43 may perform wired communication with the server 30 and the communication adapter 20.

The terminal control unit 44 controls the operation of the control terminal 40 based on the instruction information received from the input unit 41. The terminal control unit 44 transmits the information received from the input unit 41 to the server 30 via the terminal network communication unit 43. The terminal control unit 44 also performs control for displaying various information on the display unit 42.

Figure 3:
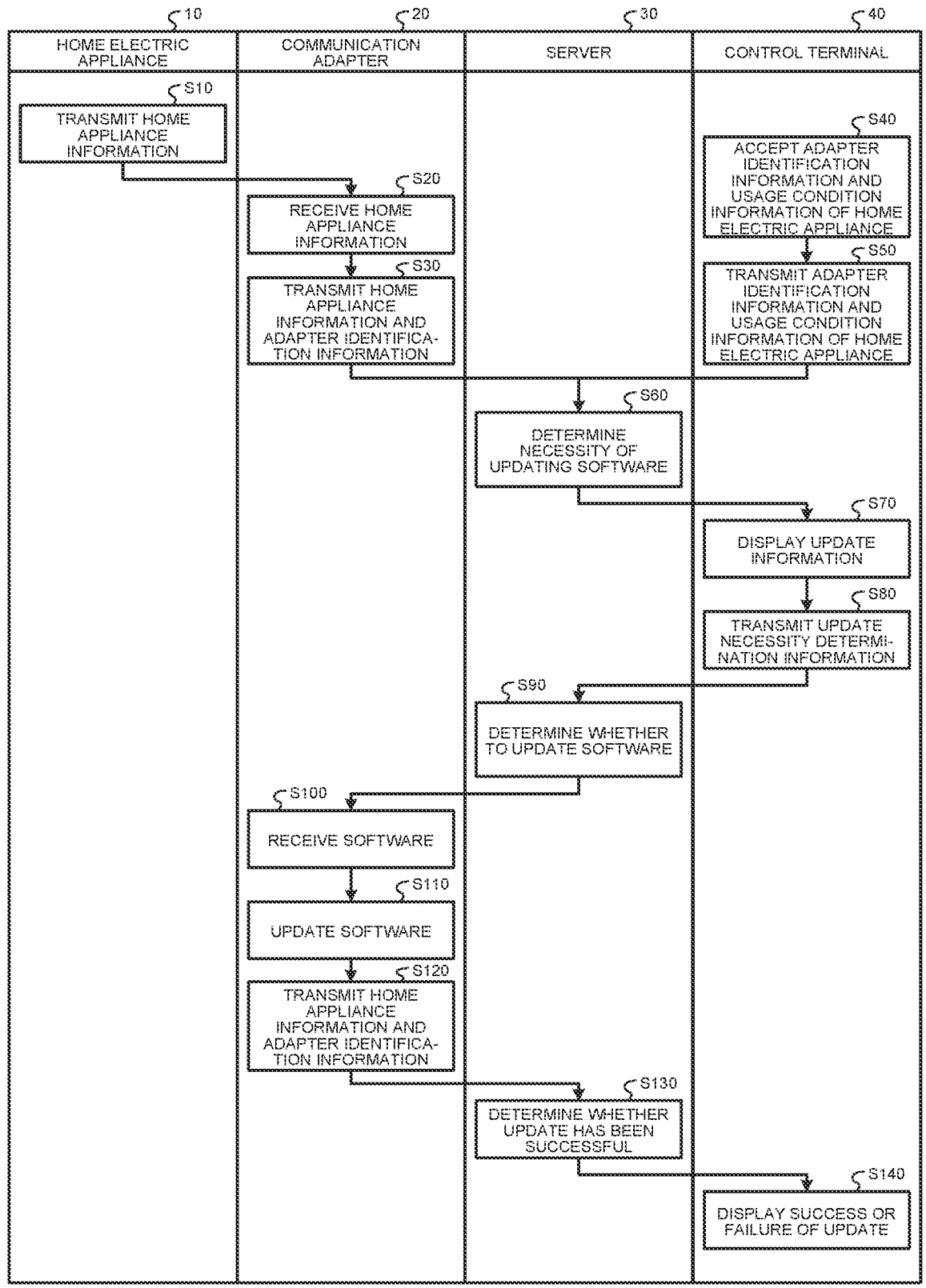
FIG. 3 is a diagram illustrating the procedure for updating the firmware of a communication adapter in the device control system illustrated in FIG. 1.

Next, the procedure for updating the firmware of the communication adapter 20 in the device control system 100 will be described. FIG. 3 is a diagram illustrating the procedure for updating the firmware of the communication adapter 20 in the device control system 100 illustrated in FIG. 1.

First, the home electric appliance 10 and the communication adapter 20 are turned on, and the home electric appliance 10 and the communication adapter 20 start up. When the home electric appliance 10 starts up, in step S10, the home appliance control unit 13 of the home electric appliance 10 transmits the home appliance information, which is the information of the home electric appliance 10 stored in the home appliance storage unit 12, to the communication adapter 20 via the home appliance communication unit 11. Note that the home appliance control unit 13 may further transmit the home appliance information set in the switch of the home electric appliance 10 to the communication adapter 20.

Next, in step S20, the adapter communication unit 21 of the communication adapter 20 receives and acquires the home appliance information from the home electric appliance 10. The adapter communication unit 21 of the communication adapter 20 transmits the received home appliance information to the adapter control unit 24 of the communication adapter 20. Here, the adapter storage unit 22 retains firmware which is initial software that cannot operate the home electric appliance 10.

Next, in step S30, the adapter control unit 24 of the communication adapter 20 transmits, to the server 30 via the adapter network communication unit 23, the home appliance information acquired from the home electric appliance 10 and the adapter identification information, which is the first identification information with which the communication adapter 20 is uniquely identifiable. The adapter identification information includes the version information of the firmware of the communication adapter 20.

In step S40, the input unit 41 of the control terminal 40 accepts, from the user, adapter identification information and usage condition information of the home electric appliance 10. The adapter identification information is the first identification information with which the communication adapter 20 is uniquely identifiable. The usage condition information of the home electric appliance 10 is information on the usage environment and usage function of the home electric appliance 10. The input unit 41 then transmits the adapter identification information and the usage condition information to the terminal control unit 44 of the control terminal 40. The first identification information is the MAC address information of the communication adapter 20 and the ID information of the communication adapter 20. The usage condition information of the home electric appliance 10 is exemplified by information on the area where the home electric appliance 10, the communication adapter 20, and the control terminal 40 are used, information on the language used by the user of the home electric appliance 10, information on whether there is a function specific to the particular home electric appliance 10, and information on usage functions such as serial keys that enable special functions of the home electric appliance 10. In an exemplary case where the home electric appliance 10 is an air conditioner, an example of a serial key is a serial key for changing the air volume setting from the fifth stage to the sixth stage.

By receiving the information of the MAC address of the communication adapter 20 and the ID of the communication adapter 20, the terminal control unit 44 can identify the communication adapter 20 as a communication partner based on the information of the MAC address of the communication adapter 20 and the ID of the communication adapter 20.

Next, in step S50, the terminal control unit 44 transmits, to the server 30 via the terminal network communication unit 43 of the control terminal 40, the adapter identification information and the usage condition information of the home electric appliance 10 received from the input unit 41.

Note that step S30 and step S50 may be executed in any order. The adapter identification information and the usage condition information of the home electric appliance 10 do not have to be manually input by the user. For example, the terminal control unit 44 may acquire information on the area where the home electric appliance 10 is used from the global positioning system (GPS) provided in the control terminal 40. In addition, the terminal control unit 44 may acquire information on the language used by the user of the home electric appliance 10 from the language setting of the operating system (OS) of the control terminal 40.

Next, in step S60, the server control unit 33 of the server 30 determines the necessity of updating the firmware of the communication adapter 20 based on the home appliance information and the adapter identification information acquired from the communication adapter 20 and on the adapter identification information and the usage condition information of the home electric appliance 10 acquired from the control terminal 40, and selects software appropriate for updating the firmware of the communication adapter 20. Note that the server control unit 33 stores the acquired home appliance information, adapter identification information, and usage condition information of the home electric appliance 10 in the server storage unit 31 of the server 30.

The server control unit 33 determines the necessity of updating the firmware of the communication adapter 20 based on the version information of the software corresponding to the latest firmware for the communication adapter 20 stored in the server storage unit 31 and on the version information of the firmware of the communication adapter 20 received from the communication adapter 20, and selects software appropriate for updating the firmware of the communication adapter 20.

If the server control unit 33 of the server 30 determines that the firmware of the communication adapter 20 need not be updated, the server control unit 33 ends the series of firmware update processes.

On the other hand, if the server control unit 33 determines that the firmware of the communication adapter 20 needs to be updated, the server control unit 33 determines the appropriate software with which the communication adapter 20 needs to be updated. The appropriate software is, for example, the software corresponding to the latest firmware for the communication adapter 20.

Then, the server control unit 33 transmits the update information about the communication adapter 20 to the control terminal 40 via the server network communication unit 32 of the server 30 so as to notify the control terminal 40 of the presence of the software with which the firmware of the communication adapter 20 needs to be updated.

The update information about the communication adapter 20 is information indicating the presence of the software with which the firmware of the communication adapter 20 needs to be updated. The update information about the communication adapter 20 includes information on the software, determined by the server control unit 33 of the server 30, with which the firmware of the communication adapter 20 needs to be updated.

Note that the server control unit 33 of the server 30 may proceed to step 390, which will be described later, without notifying the control terminal 40, depending on the type of the determined software with which the firmware of the communication adapter 20 needs to be updated.

Next, in step S70, the terminal control unit 44 of the control terminal 40 receives the update information from the server control unit 33. The terminal control unit 44 displays the update information on the display unit 42 of the control terminal 40 to notify the user that the firmware of the communication adapter 20 needs to be updated, and prompts the user to determine the necessity of updating the firmware of the communication adapter 20.

The user determines the necessity of updating the firmware of the communication adapter 20 based on the update information displayed on the display unit 42, and inputs update necessity determination information, i.e. information indicating the necessity of update, to the input unit 41 of the control terminal 40.

If the user determines that the firmware of the communication adapter 20 need not be updated, the user inputs unnecessity information, i.e. update necessity determination information indicating that the firmware of the communication adapter 20 need not be updated, to the input unit 41 of the control terminal 40.

On the other hand, if the user determines that the firmware of the communication adapter 20 needs to be updated, the user inputs necessity information, i.e. update necessity determination information indicating that the firmware of the communication adapter 20 needs to be updated, to the input unit 41 of the control terminal 40.

In step S80, the input unit 41 of the control terminal 40 accepts the update necessity determination information input from the user, and transmits the update necessity determination information to the terminal control unit 44 of the control terminal 40. The terminal control unit 44 receives the update necessity determination information, and then transmits the update necessity determination information to the server control unit 33 of the server 30 via the terminal network communication unit 43.

Upon receiving the update necessity determination information from the control terminal 40, the server control unit 33 determines in step S90 whether to update the firmware of the communication adapter 20 based on the update necessity determination information.

If the received update necessity determination information is unnecessity information, the server control unit 33 ends the series of firmware update processes.

If the received update necessity determination information is necessity information, the server control unit 33 acquires data of the appropriate software selected in step S60 from the server storage unit 31, and transmits the data to the adapter control unit 24 of the communication adapter 20 via the server network communication unit 32.

The server control unit 33 may directly proceed from step S60 to step S90, in which case the server control unit 33 acquires data of the appropriate software selected in step S60 from the server storage unit 31, and transmits the data to the adapter control unit 24 of the communication adapter 20 using the server network communication unit 32.

In step S100, the adapter control unit 24 receives the software data transmitted from the server control unit 33, and then stores the software data in the adapter storage unit 22 of the communication adapter 20.

Next, in step S110, the adapter control unit 24 operates according to the boot program stored in the adapter storage unit 22 to update the firmware. Note that the boot program is not updated in the procedure illustrated in FIG. 3.

The adapter control unit 24 first saves the currently operating firmware to the adapter storage unit 22. The adapter control unit 24 stops the currently operating firmware. Then, the adapter control unit 24 updates the firmware by using the software data for updating the firmware, which has been acquired from the server control unit 33 and stored in the adapter storage unit 22. After the firmware update is properly completed, the adapter control unit 24 deletes the previous firmware of the communication adapter 20 stored in the adapter storage unit 22. This can prevent the capacity of the software stored in the adapter storage unit 22 from becoming bloated, which enables the capacity of the adapter storage unit 22 to be effectively utilized without the need to increase the capacity of the adapter storage unit 22.

If the firmware update fails, the adapter control unit 24 restarts the update. Note that if the firmware update fails, the adapter control unit 24 may rewrite the firmware with the firmware stopped before the start of the firmware update.

Next, in step S120, the adapter control unit 24 of the communication adapter 20 transmits the home appliance information and the adapter identification information to the server control unit 33 of the server 30 via the adapter network communication unit 23 of the communication adapter 20 in the same manner as in the case of step S30. The adapter identification information includes the version information of the firmware of the communication adapter 20 that has been updated.

If the software update fails and the firmware is rewritten with the saved software that is currently operating, the adapter control unit 24 of the communication adapter 20 transmits, to the server control unit 33 of the server 30, the version information of the saved software that is currently operating instead of the version information of the software that has been updated.

Next, in step S130, the server control unit 33 determines whether the firmware update of the communication adapter 20 has been successful based on the information received from the communication adapter 20. The server control unit 33 determines whether the firmware update of the communication adapter 20 has been successful based on the version information, received from the communication adapter 20, of the firmware that has been updated.

The server storage unit 31 of the server 30 retains the pre-update version information of the firmware of the communication adapter 20 stored in step S60. The server control unit 33 compares the pre-update version information of the firmware of the communication adapter 20 with the version information of the firmware of the communication adapter 20 transmitted from the communication adapter 20 in step S120, thereby determining whether the firmware update of the communication adapter 20 has been successful.

If the pre-update version information of the firmware of the communication adapter 20 and the version information of the firmware received from the communication adapter 20 are different, the server control unit 33 of the server 30 determines that the firmware update of the communication adapter 20 has been successful.

On the other hand, if the software update of the communication adapter 20 fails in step S110, the server control unit 33 receives, from the adapter control unit 24, the pre-update version information of the firmware of the communication adapter 20, instead of the version information of the software that has been updated. The pre-update version information of the firmware of the communication adapter 20 is the same as the version information of the firmware retained in the server storage unit 31. Therefore, if the version information of the firmware retained in the server storage unit 31 and the version information of the firmware received from the communication adapter 20 are the same, the server control unit 33 determines that the firmware update of the communication adapter 20 has failed.

Then, the server control unit 33 transmits, to the terminal control unit 44 of the control terminal 40, information on the success or failure of the firmware update of the communication adapter 20.

Next, in step S140, the terminal control unit 44 receives the information, transmitted from the server control unit 33, on the success or failure of the firmware update of the communication adapter 20, and displays the success or failure of the firmware update of the communication adapter 20 on the display unit 42 based on the received information to notify the user.

Figure 4:
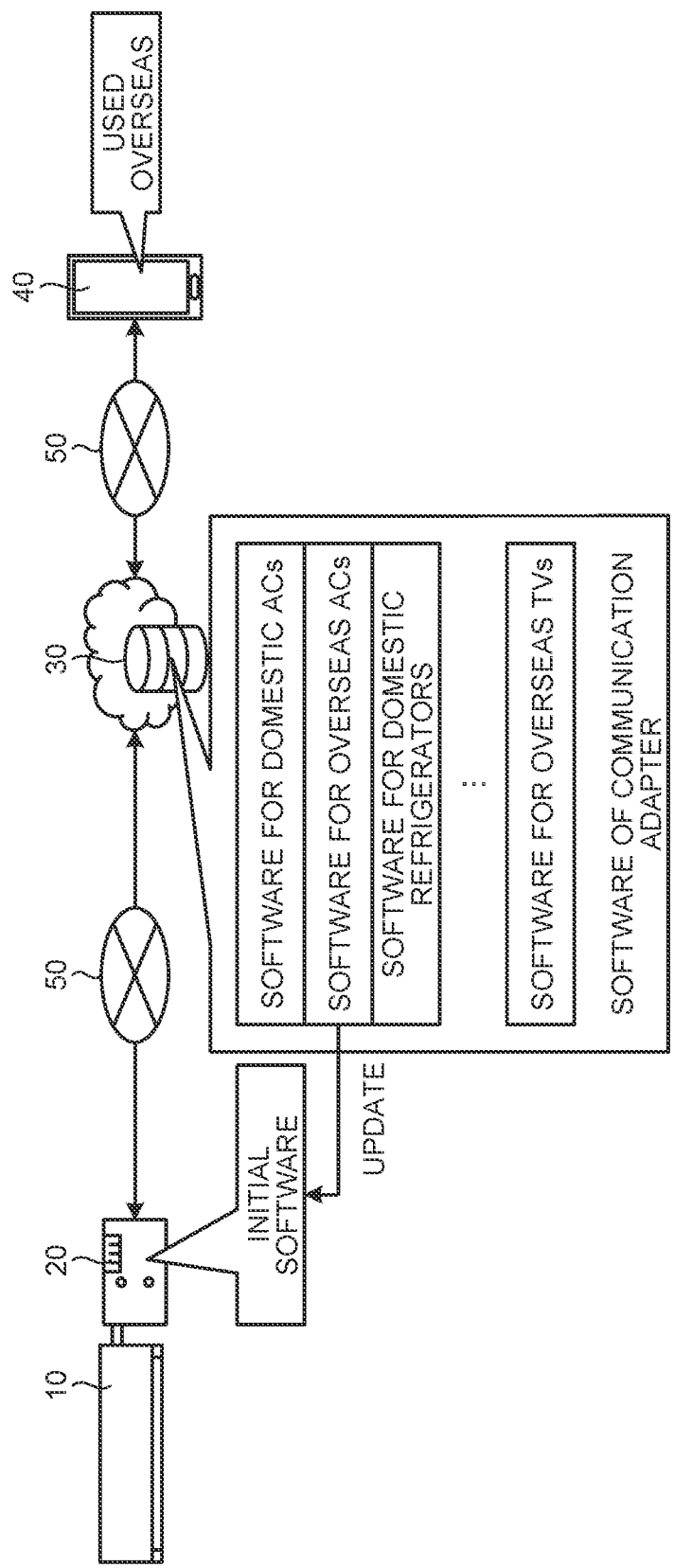
FIG. 4 is a diagram illustrating a specific exemplary configuration of the device control system illustrated in FIG. 1.

FIG. 4 is a diagram illustrating a specific exemplary configuration of the device control system 100 illustrated in FIG. 1. Here, the home electric appliance 10 is an overseas air conditioner that is used overseas. Hereinafter, air conditioners may be referred to as ACs. The software stored in the communication adapter 20 is initial software that can perform network communication with the server 30 but cannot operate the home electric appliance 10. The home electric appliance 10, the communication adapter 20, and the control terminal 40 are supposed to be used overseas.

The server storage unit 31 of the server 30 stores multiple different pieces of software for the communication adapter 20 having a one-to-one relation with different types of home electric appliances. The server storage unit 31 stores multiple different pieces of software that make the communication adapter 20 compatible with a plurality of different home electric appliances, such as software for domestic ACs, software for overseas ACs, software for domestic refrigerators, and software for overseas TVs.

The device control system 100 performs the procedure of steps S10 to S140 described above. That is, first, in step S10, the home electric appliance 10 which is an AC transmits, to the communication adapter 20, the home appliance information including information indicating that the home electric appliance 10 is an AC.

In step S20, the adapter communication unit 21 receives the home appliance information from the home electric appliance 10, and transmits the received home appliance information to the adapter control unit 24 of the communication adapter 20.

In step S30, the adapter control unit 24 transmits the home appliance information and the adapter identification information to the server 30 via the adapter network communication unit 23.

In step S40, the input unit 41 of the control terminal 40 accepts the adapter identification information and the usage condition information of the home electric appliance 10 from the user, and transmits the adapter identification information and the usage condition information to the terminal control unit 44 of the control terminal 40.

In step S50, the terminal control unit 44 transmits the adapter identification information and the usage condition information of the home electric appliance 10 to the server control unit 33 of the server 30. The usage condition information of the home electric appliance 10 includes information indicating that the control terminal 40 is used overseas.

In step S60, the server control unit 33 determines the necessity of updating the software of the communication adapter 20. In addition, based on the information indicating that the control terminal 40 is used overseas, the server control unit 33 selects software for overseas ACs as software appropriate for updating the software of the communication adapter 20.

In step S70, the terminal control unit 44 displays the update information on the display unit 42 of the control terminal 40 to prompt the user to determine the necessity of updating the firmware of the communication adapter 20.

In step S80, the terminal control unit 44 transmits, to the server control unit 33, necessary information as update necessity determination information accepted from the user.

Upon receiving the necessary information as update necessity determination information from the control terminal 40, the server control unit 33 determines in step S90 to update the firmware of the communication adapter 20 based on the update necessity determination information, and transmits the data of the software for overseas ACs to the adapter control unit 24.

In step S100, the adapter control unit 24 receives the data of the software for overseas ACs transmitted from the server control unit 33, and stores the data in the adapter storage unit 22.

In step S110, the adapter control unit 24 updates the initial software of the communication adapter 20 using the data of the software for overseas ACs.

After that, steps S120 to S140 are performed in the same manner as described above.

By using the device control system 100 and the communication adapter 20 described above, the server 30 selects appropriate software based on the home appliance information and the usage condition information of the home electric appliance 10 after the communication adapter 20 is connected to the home electric appliance 10. Then, the communication adapter 20 executes the network update of the software using the software selected by the server 30. As a result, the communication adapter 20 can change the retained software to software specialized for the home electric appliance 10 connected. Thus, the communication adapter 20 does not need to hold a collection of software that supports all the communication formats of compatible home electric appliances 10, so that the storage capacity can be reduced and the functionality of the communication adapter can be flexibly restricted.

That is, in the device control system 100, after the communication adapter 20 is connected to the home electric appliance 10, the software stored in the communication adapter 20 can be updated to the appropriate software necessary for operating the home electric appliance 10 from the control terminal 40. As a result, the communication adapter 20 need not store individual pieces of software dedicated to a plurality of home electric appliances 10 at the time of production. Therefore, according to the communication adapter 20, it is not necessary to switch the communication adapter production process to add individual pieces of software each time a new and different compatible home electric appliance is manufactured, and it is possible to reduce the person-hours required for the production of the communication adapter 20.

In addition, in the device control system 100 described above, the server 30 determines the necessity of updating the firmware of the communication adapter 20 based on the adapter identification information and the usage condition information of the home electric appliance 10 acquired from the control terminal 40, and selects software appropriate for the update. As a result, the server 30 can select software in a manner that supports various home electric appliances and reduces capacity, which widens the applicable range of the communication adapter 20.

Although the above description refers to the update of the initial software of the communication adapter 20, it is also possible to update software other than the firmware stored in the communication adapter 20 in the same manner.

Although the above description refers to the case where the home electric appliance supported by the software stored in the communication adapter 20 is the same as the home electric appliance 10 currently connected to the communication adapter 20, there may be a case where the home electric appliance 10 supported by the software stored in the communication adapter 20 is different from the home electric appliance 10 currently connected to the communication adapter 20. In this case, it is also possible to update the software stored in the communication adapter 20 in the same manner. For example, the communication adapter 20 that retains software corresponding to ACs can be connected to another home electric appliance 10, e.g. a refrigerator, in which case the software corresponding to ACs stored in the communication adapter 20 is updated to and overwritten with software corresponding to refrigerators.

The above exemplary description refers to the case where the software stored in the communication adapter 20 is software for overseas ACs which is initial software that cannot operate the home electric appliance 10. The communication adapter 20 used in connection with an overseas AC may be compatible with not only overseas ACs but also other types of home electric appliances.

For example, after the communication adapter 20 is connected to an overseas AC and used through an update of software for overseas ACs, the communication adapter 20 can be used in connection with an overseas refrigerator, i.e. a home electric appliance other than the overseas AC. In this case, the procedure illustrated in the flowchart of FIG. 3 is performed, whereby the software for home electric appliances stored in the communication adapter 20 can be updated to software for overseas refrigerators. Then, the software for overseas ACs is deleted from the adapter storage unit 22 of the communication adapter 20. Therefore, it is not necessary to increase the capacity of the adapter storage unit 22 of the communication adapter 20 at the time of production, and the storage capacity of the adapter storage unit 22 can be effectively utilized to support a plurality of different home electric appliances. That is, the communication adapter 20 can support a plurality of different home electric appliances with a small storage capacity.

Recent home electric appliances often have different communication specifications according to their type, and communication adapters that are connected to home electric appliances for the Internet of Things (IoT) require different types of software compatible with different home electric appliances. In particular, in order to use one communication adapter to support a plurality of home electric appliances including a plurality of home electric appliances having specific functions for particular users, it is necessary to design software for the communication adapter so as to avoid collisions between the functions unique to the home electric appliances to be supported. This makes the software of the communication adapter complicated and bloated, consuming the storage capacity of the communication adapter.

On the other hand, by using the device control system 100 and the communication adapter 20, the above problems can be solved.

However, if the communication adapter stores multiple pieces of software for compatible home electric appliances at the time of production, the storage capacity of the communication adapter increases. In addition, if the communication adapter is used in connection with a home electric appliance that is not compatible with any piece of software stored in the communication adapter, another piece of software must be added to the communication adapter, which makes it difficult to estimate the storage capacity of the communication adapter at the time of production.

As described above, the device control system 100 according to the first embodiment can achieve the effect of reducing the storage capacity of the communication adapter 20 capable of supporting a plurality of home electric appliances 10, and of updating the software of the communication adapter to software specialized for the connected home electric appliance 10 in a manner that conforms to the appliance-specific usage condition.

Second Embodiment

The second embodiment is a modification of the device control system 100 according to the first embodiment, describing a system in which the communication adapter 20 and the control terminal 40 directly communicate with each other only in the house with no intervention of the Internet network 50 to implement remote control of the home electric appliance 10.

Figure 5:
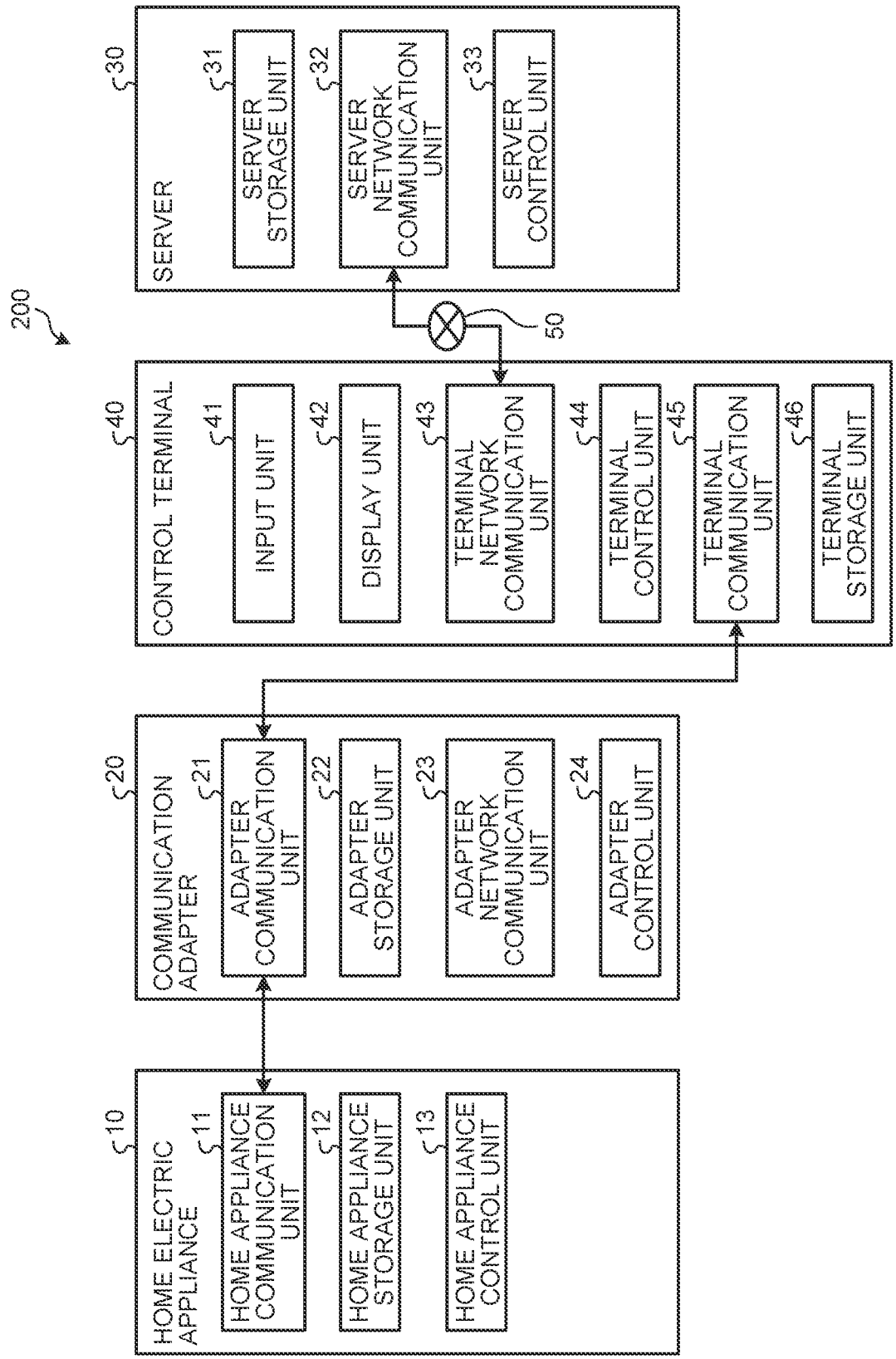
FIG. 5 is a diagram illustrating an exemplary configuration of a device control system according to a second embodiment of the present invention.
Figure 6:
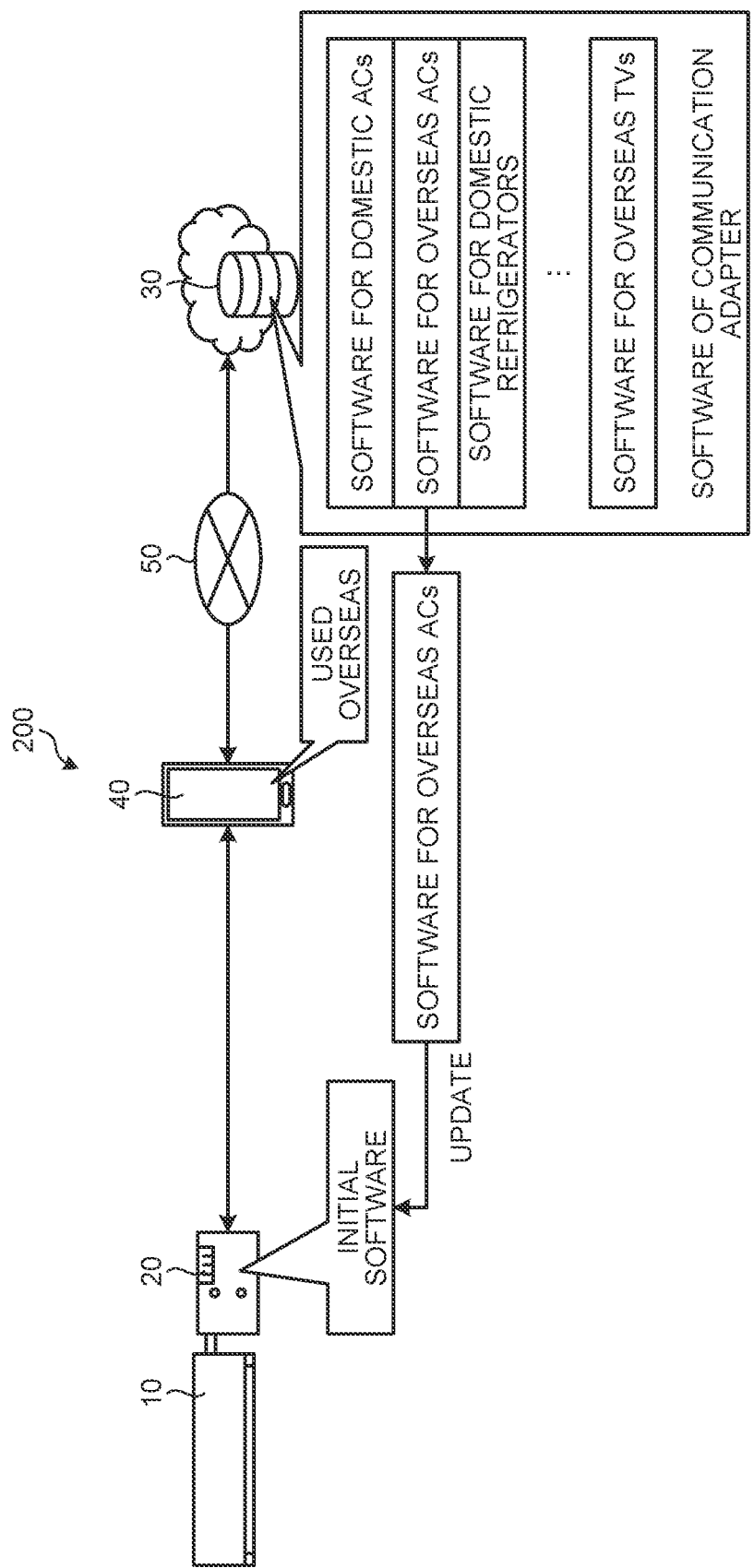
FIG. 6 is a diagram illustrating a specific exemplary configuration of the device control system illustrated in FIG. 5.

FIG. 5 is a diagram illustrating an exemplary configuration of a device control system 200 according to the second embodiment of the present invention. FIG. 6 is a diagram illustrating a specific exemplary configuration of the device control system 200 illustrated in FIG. 5. The device control system 200 differs from the device control system 100 according to the first embodiment in the following points. The software stored in the communication adapter 20 is initial software that can wirelessly communicate with the control terminal 40 but cannot operate the home electric appliance 10. The control terminal 40 includes a terminal communication unit 45 that directly performs wireless communication with the communication adapter 20 with no intervention of the Internet network 50. The control terminal 40 also includes a terminal storage unit 46 that stores software data transmitted from the server control unit 33. The adapter control unit 24 transmits the home appliance information and the adapter identification information to the control terminal 40 via the adapter communication unit 21.

Figure 7:
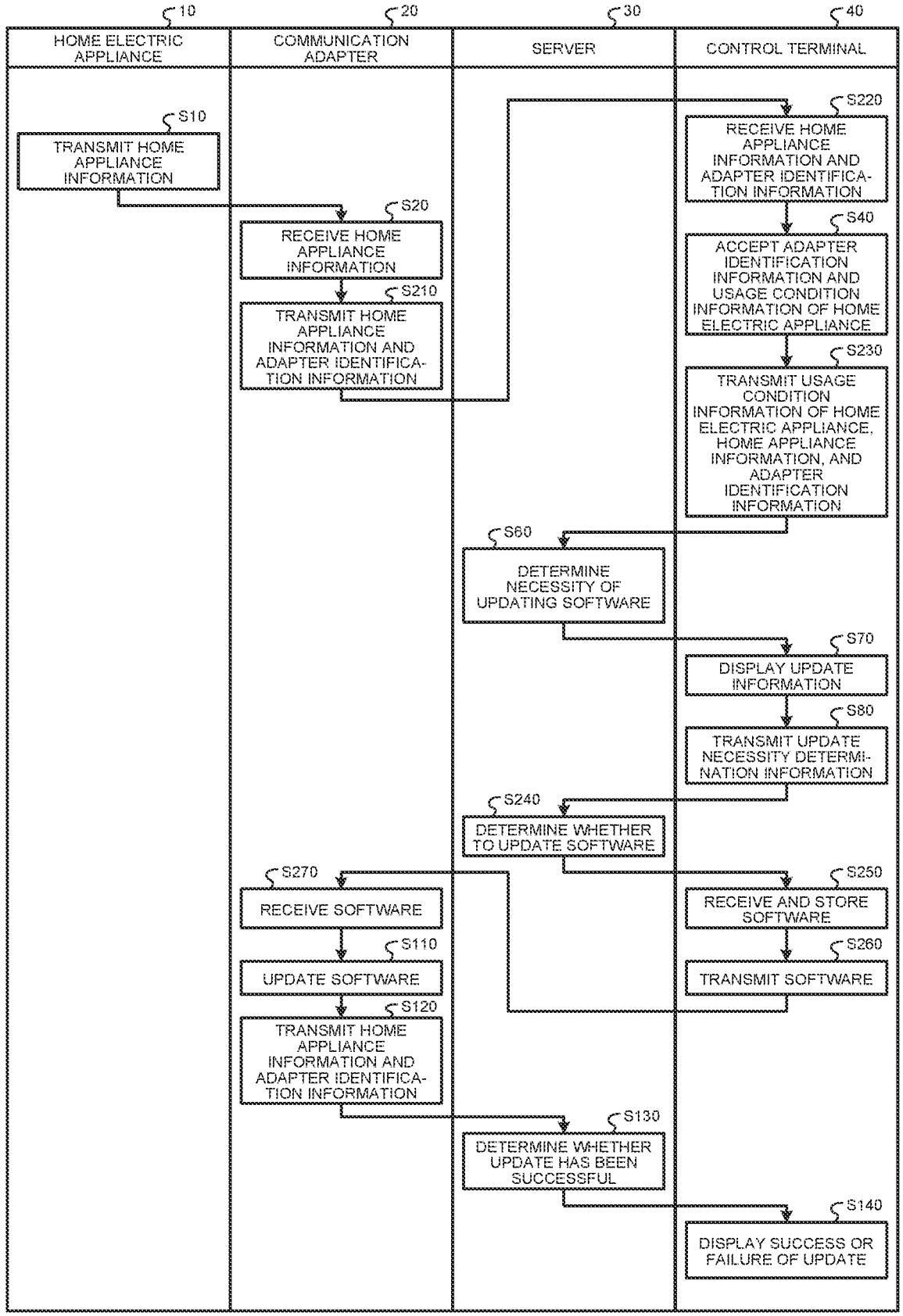
FIG. 7 is a diagram illustrating the procedure for updating the firmware of a communication adapter in the exemplary configuration of the device control system illustrated in FIG. 6.

FIG. 7 is a diagram illustrating the procedure for updating the firmware of the communication adapter 20 in the exemplary configuration of the device control system 200 illustrated in FIG. 6. The diagram illustrated in FIG. 7 differs from the diagram illustrated in FIG. 3 in that step S210 is performed instead of step S30, step S230 is performed instead of step S50, step S240 is performed instead of step S90, step S270 is performed instead of step S100, and steps S220, S250, and S260 are added.

In addition, this procedure is based on the premise that the software appropriate for updating the firmware of the communication adapter 20 which is selected in step S60 is software for overseas ACs.

In step S210, the adapter control unit 24 of the communication adapter 20 transmits the home appliance information and the adapter identification information to the terminal communication unit 45 of the control terminal 40 via the adapter communication unit 21.

In step S220, the terminal communication unit 45 transmits the received home appliance information and the adapter identification information to the terminal control unit 44 of the control terminal 40.

In step S230, the terminal control unit 44 transmits the adapter identification information, the usage condition information of the home electric appliance 10, and the home appliance information to the server 30 via the terminal network communication unit 43 of the control terminal 40. The usage condition information of the home electric appliance 10 includes information indicating that the control terminal 40 is used overseas. Note that the terminal control unit 44 only needs to acquire the adapter identification information from at least one of the adapter control unit 24 and the input unit 41.

Upon receiving the update necessity determination information from the control terminal 40, the server control unit 33 determines in step S240 whether to update the firmware of the communication adapter 20 based on the update necessity determination information.

If the received update necessity determination information is unnecessity information, the server control unit 33 ends the series of firmware update processes.

If the received update necessity determination information is necessity information, the server control unit 33 acquires data of the appropriate software selected in step S60 from the server storage unit 31, and transmits the data to the terminal control unit 44 of the control terminal 40 via the server network communication unit 32.

The server control unit 33 may directly proceed from step S60 to step S240, in which case the server control unit 33 acquires data of the appropriate software selected in step S60 from the server storage unit 31, and transmits the data to the terminal control unit 44 of the control terminal 40 via the server network communication unit 32.

In step S250, the terminal control unit 44 receives the data of the software for overseas ACs transmitted from the server control unit 33, and temporarily stores the data in the terminal storage unit 46.

In step S260, the terminal control unit 44 transmits the data of the software for overseas ACs temporarily stored in the terminal storage unit 46 to the adapter control unit 24 of the communication adapter 20.

In step S270, the adapter control unit 24 receives the software for overseas ACs transmitted from the terminal control unit 44, and then stores the software in the adapter storage unit 22 of the communication adapter 20.

The device control system 200 according to the second embodiment described above can achieve the same effect as the device control system 100 according to the first embodiment.

Third Embodiment

Figure 8:
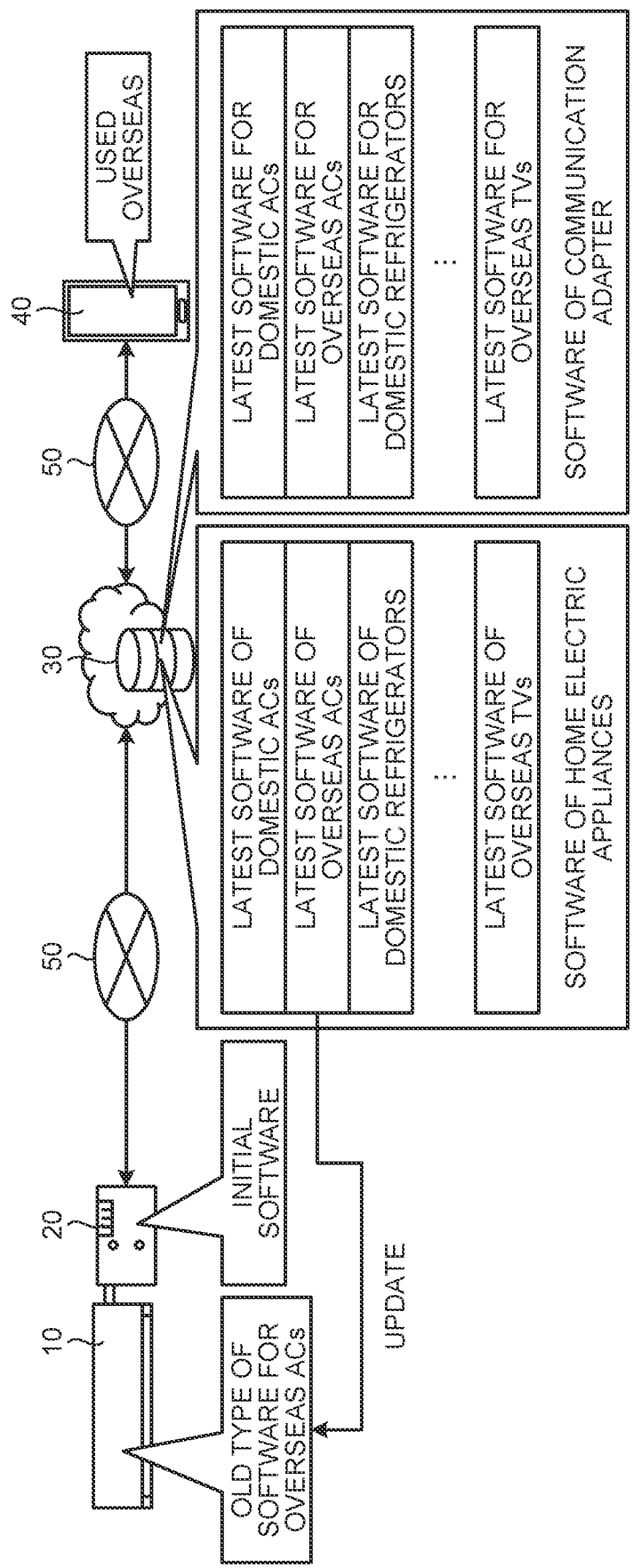
FIG. 8 is a diagram illustrating a specific exemplary configuration of a device control system according to a third embodiment.

The third embodiment describes a case where the firmware of the home electric appliance 10 is updated in the device control system 100 according to the first embodiment. FIG. 8 is a diagram illustrating a specific exemplary configuration of the device control system 100 according to the third embodiment. The home electric appliance 10 is an overseas AC that is used overseas. The software stored in the communication adapter 20 is initial software that can perform network communication with the server 30 but cannot operate the home electric appliance 10. The firmware stored in the home appliance storage unit 12 of the home electric appliance 10 is an old type of software for overseas ACs. The home electric appliance 10, the communication adapter 20, and the control terminal 40 are supposed to be used overseas.

In the third embodiment, the server storage unit 31 of the server 30 stores multiple different pieces of software for the communication adapter 20 having a one-to-one relation with different types of home electric appliances. The server storage unit 31 stores multiple different pieces of software for the communication adapter 20 that make the communication adapter 20 compatible with a plurality of different home electric appliances, such as the latest software for domestic ACs, the latest software for overseas ACs, the latest software for domestic refrigerators, and the latest software for overseas TVs.

In the third embodiment, the server storage unit 31 of the server 30 stores multiple different pieces of software for home electric appliances having a one-to-one relation with different types of home electric appliances. The server storage unit 31 stores multiple different pieces of software for home electric appliances, such as the latest software of domestic ACs, the latest software of overseas ACs, the latest software of domestic refrigerators, and the latest software of overseas TVs.

Figure 9:
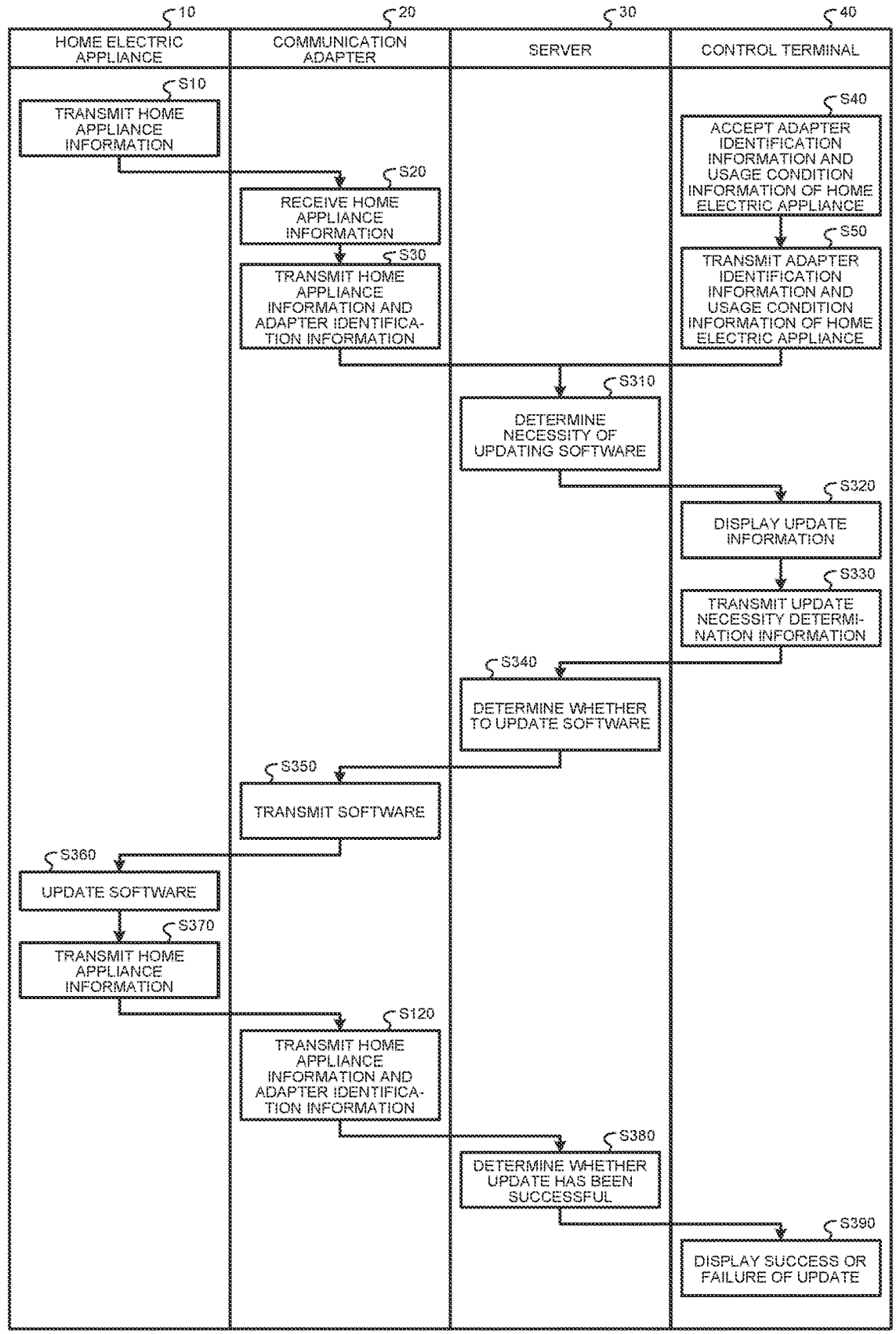
FIG. 9 is a diagram illustrating the procedure for updating the firmware of an overseas AC as a home electric appliance in the exemplary configuration of the device control system illustrated in FIG. 8.

FIG. 9 is a diagram illustrating the procedure for updating the firmware of an overseas AC as the home electric appliance 10 in the exemplary configuration of the device control system 100 illustrated in FIG. 8. The diagram illustrated in FIG. 9 differs from the diagram illustrated in FIG. 3 in that step S310 is performed instead of step S60, step S320 is performed instead of step S70, step S330 is performed instead of step S80, step S340 is performed instead of step S90, step S350 is performed instead of step S100, step S360 is performed instead of step S110, step S380 is performed instead of step S130, step S390 is performed instead of step S140, and step S370 is added.

In step S310, the server control unit 33 of the server 30 determines the necessity of updating the firmware of the overseas AC, which is the home electric appliance 10, based on the home appliance information and the adapter identification information acquired from the communication adapter 20 and on the adapter identification information and the usage condition information of the home electric appliance 10 acquired from the control terminal 40, and selects software appropriate for updating the firmware of the home electric appliance 10. Note that the server control unit 33 stores the acquired home appliance information, adapter identification information, and adapter identification information and usage condition information of the home electric appliance 10 in the server storage unit 31 of the server 30.

The server control unit 33 determines the necessity of updating the firmware of the home electric appliance 10 based on the version information of the software corresponding to the latest firmware of the home electric appliance 10 stored in the server storage unit 31 and on the version information of the firmware of the home electric appliance 10 received from the communication adapter 20, and selects software appropriate for updating the firmware of the home electric appliance 10.

If the server control unit 33 of the server 30 determines that the firmware of the home electric appliance 10 need not be updated, the server control unit 33 ends the series of firmware update processes for the home electric appliance 10.

On the other hand, if the server control unit 33 determines that the firmware of the home electric appliance 10 needs to be updated, the server control unit 33 determines the appropriate software with which the home electric appliance 10 needs to be updated. The appropriate software is, for example, the software corresponding to the latest firmware of the home electric appliance 10.

Then, the server control unit 33 transmits the update information about the home electric appliance 10 to the control terminal 40 via the server network communication unit 32 of the server 30 so as to notify the control terminal 40 of the presence of the software with which the firmware of the home electric appliance 10 needs to be updated.

The update information about the home electric appliance 10 is information indicating the presence of the software with which the firmware of the home electric appliance 10 needs to be updated. The update information about the home electric appliance 10 includes information on the software, determined by the server control unit 33 of the server 30, with which the firmware of the home electric appliance 10 needs to be updated.

In step S320, the process performed in relation to the update of the firmware of the communication adapter 20 in step S70 is performed in relation to the update of the firmware of the home electric appliance 10.

In step S330, the process performed in relation to the update of the firmware of the communication adapter 20 in step S80 is performed in relation to the update of the firmware of the home electric appliance 10.

In step S340, the process performed in relation to the update of the firmware of the communication adapter 20 in step S90 is performed in relation to the update of the firmware of the home electric appliance 10. The server control unit 33 transmits the data of the appropriate software selected in step S310 to the adapter control unit 24 of the communication adapter 20.

In step S350, the adapter control unit 24 receives the software data transmitted from the server control unit 33, and then temporarily stores the software data in the adapter storage unit 22 of the communication adapter 20. Then, the adapter control unit 24 transmits the software data stored in the adapter storage unit 22 to the home electric appliance 10. Note that the capacity of the software data transmitted from the server control unit 33 may exceed the storage capacity of the adapter storage unit 22. In such a situation, the server control unit 33 can divide the software data for transmission in step S340.

In step S360, the home appliance control unit 13 stores the software data transmitted from the adapter control unit 24 in the home appliance storage unit 12 of the home electric appliance 10. The home appliance control unit 13 saves the currently operating firmware to the home appliance storage unit 12. The home appliance control unit 13 stops the currently operating firmware. Then, the home appliance control unit 13 updates the firmware by using the software data for updating the firmware, which has been acquired from the adapter control unit 24 and stored in the home appliance storage unit 12. After the firmware update is properly completed, the home appliance control unit 13 deletes the previous firmware of the home electric appliance 10 stored in the home appliance storage unit 12.

If the firmware update fails, the home appliance control unit 13 restarts the update. Note that if the firmware update fails, the home appliance control unit 13 may rewrite the firmware with the firmware stopped before the start of the firmware update.

In step S370, the home appliance control unit 13 transmits the home appliance information, which is the information of the home electric appliance 10 stored in the home appliance storage unit 12, to the communication adapter 20 via the home appliance communication unit 11.

In step S380, the process performed in relation to the update of the firmware of the communication adapter 20 in step S130 is performed in relation to the update of the firmware of the home electric appliance 10. The server control unit 33 determines whether the firmware update of the home electric appliance 10 has been successful based on the information received from the communication adapter 20. The server control unit 33 determines whether the firmware update of the home electric appliance 10 has been successful based on the version information, received from the communication adapter 20, of the firmware that has been updated.

The server storage unit 31 of the server 30 retains the pre-update version information of the firmware of the home electric appliance 10 stored in step S310. The server control unit 33 compares the pre-update version information of the firmware of the home electric appliance 10 with the version information of the firmware of the home electric appliance 10 transmitted from the communication adapter 20 in step S120, thereby determining whether the firmware update of the home electric appliance 10 has been successful.

If the pre-update version information of the firmware of the home electric appliance 10 and the version information of the firmware of the home electric appliance 10 received from the communication adapter 20 in step S120 are different, the server control unit 33 of the server 30 determines that the firmware update of the home electric appliance 10 has been successful.

On the other hand, if the pre-update version information of the firmware of the home electric appliance 10 and the version information of the firmware of the home electric appliance 10 received from the communication adapter 20 in step S120 are the same, the server control unit 33 determines that the firmware update of the home electric appliance 10 has failed.

Then, the server control unit 33 transmits, to the terminal control unit 44 of the control terminal 40, information on the success or failure of the firmware update of the home electric appliance 10.

Next, in step S390, the terminal control unit 44 receives the information, transmitted from the server control unit 33, on the success or failure of the firmware update of the home electric appliance 10, and displays the success or failure of the firmware update of the home electric appliance 10 on the display unit 42 based on the received information to notify the user.

Note that the positional relationship and processing between the server 30 and the control terminal 40 in the firmware update of the home electric appliance 10 described above can be replaced with those described in the second embodiment.

In addition, it is possible to appropriately update the firmware of the communication adapter 20 and the firmware of the home electric appliance 10 by combining the procedure illustrated in FIG. 3 and the procedure illustrated in FIG. 9. In this case, if the software transmitted from the server 30 is software for the communication adapter 20, the adapter control unit 24 updates the software of the communication adapter 20 with the software transmitted from the server 30. If the software transmitted from the server 30 is software for the home electric appliance 10, the adapter control unit 24 transmits the software transmitted from the server 30 to the home electric appliance 10.

Although the above description refers to the update of the initial software of the home electric appliance 10, it is also possible to update software other than the firmware stored in the home electric appliance 10 in the same manner.

In addition, in the firmware update processing for the home electric appliance 10 according to the third embodiment described above, the server 30 determines the necessity of updating the firmware of the home electric appliance 10 based on the adapter identification information and the usage condition information of the home electric appliance 10 acquired from the control terminal 40, and selects software appropriate for the update. As a result, the server 30 can select software from among various types of software in a manner that supports various home electric appliances and reduces capacity, and can accurately update the firmware of the home electric appliance 10.

Fourth Embodiment

FIG. 10 is a diagram illustrating an exemplary configuration of a device control system 300 according to the fourth embodiment of the present invention. The fourth embodiment describes a home electric appliance 110 including an external communication device 60 having the same function as the communication adapter 20 described above. The device control system 300 is a modification of the device control system 100 described above. The device control system 300 according to the fourth embodiment includes the home electric appliance 110 that is a device to be controlled including the external communication device 60, the server 30 that communicates with the external communication device 60, and the control terminal 40 that communicates with the server 30. The external communication device 60 has a configuration corresponding to the communication adapter 20 described above, and performs the same processing as the communication adapter 20 inside the home electric appliance 110. In addition to the components of the home electric appliance 10 described above, the home electric appliance 110 includes the external communication device 60.

The external communication device 60 is a network communication device built in the home electric appliance 110 to add, to the home electric appliance 110, the function of network communication with the server 30 external to the home electric appliance 110. The external communication device 60 is communicable with the home appliance communication unit 11 of the home electric appliance 110, and operable based on the software acquired from the server 30 by directly or indirectly communicating with the server 30. The external communication device 60 includes an external communication unit 61, an external communication storage unit 62, an external network communication unit 63, and an external communication control unit 64. Each component in the external communication device 60 can send and receive information.

Each component in the external communication device 60 has a corresponding component in the communication adapter 20. That is, the external communication unit 61 corresponds to the adapter communication unit 21. The external communication storage unit 62 corresponds to the adapter storage unit 22. The external network communication unit 63 corresponds to the adapter network communication unit 23. The external communication control unit 64 corresponds to the adapter control unit 24.

Next, the procedure for updating the firmware of the external communication device 60 in the device control system 300 will be described. FIG. 11 is a diagram illustrating the procedure for updating the firmware of the external communication device 60 in the device control system 300 illustrated in FIG. 10.

First, the home electric appliance 110 is turned on, and the home electric appliance 110 starts up. When the home electric appliance 110 starts up, in step S510, the home appliance control unit 13 of the home electric appliance 110 transmits the home appliance information, which is the information of the home electric appliance 110 stored in the home appliance storage unit 12, to the external communication device 60 via the home appliance communication unit 11. Note that the home appliance control unit 13 may directly transmit the home appliance information to the external communication device 60.

Next, in step 3520, the external communication unit 61 of the external communication device 60 receives and acquires the home appliance information from the home appliance control unit 13. The external communication unit 61 of the external communication device 60 transmits the received home appliance information to the external communication control unit 64 of the external communication device 60.

Here, the external communication storage unit 62 retains firmware which is initial software that cannot operate the home electric appliance 110.

Next, in step S530, the external communication control unit 64 of the external communication device 60 transmits, to the server 30 via the external network communication unit 63, the home appliance information acquired from the home appliance control unit 13 and external communication device identification information, which is third identification information with which the external communication device 60 is uniquely identifiable. The external communication device identification information is information corresponding to the adapter identification information. The external communication device identification information is network communication device identification information, i.e. identification information with which the network communication device is uniquely identifiable. The external communication device identification information includes the version information of the firmware of the external communication device 60.

In step S540, the input unit 41 of the control terminal 40 accepts, from the user, external communication device identification information and usage condition information of the home electric appliance 110. The external communication device identification information is the third identification information with which the external communication device 60 is uniquely identifiable. The usage condition information of the home electric appliance 110 is information on the usage environment and usage function of the home electric appliance 110. The input unit 41 then transmits the external communication device identification information and the usage condition information to the terminal control unit 44 of the control terminal 40. The third identification information is the MAC address information of the external communication device 60 and the ID information of the external communication device 60. The usage condition information of the home electric appliance 110 is exemplified by information on the area where the home electric appliance 110 and the control terminal 40 are used, information on the language used by the user of the home electric appliance 110, information on whether there is a function specific to the particular home electric appliance 110, and information on usage functions such as serial keys that enable special functions of the home electric appliance 110.

By receiving the information of the MAC address of the external communication device 60 and the ID of the external communication device 60, the terminal control unit 44 can identify the external communication device 60 as a communication partner based on the information of the MAC address of the external communication device 60 and the ID of the external communication device 60.

Next, in step 3550, the terminal control unit 44 transmits, to the server 30 via the terminal network communication unit 43 of the control terminal 40, the external communication device identification information and the usage condition information of the home electric appliance 110 received from the input unit 41.

Note that step 3530 and step 3550 may be executed in any order. The external communication device identification information and the usage condition information of the home electric appliance 110 do not have to be manually input by the user. For example, the terminal control unit 44 may acquire information on the area where the home electric appliance 110 is used from the GPS provided in the control terminal 40. In addition, the terminal control unit 44 may acquire information on the language used by the user of the home electric appliance 110 from the language setting of the OS of the control terminal 40.

Next, in step S560, the server control unit 33 of the server 30 determines the necessity of updating the firmware of the external communication device 60 based on the home appliance information and the external communication device identification information acquired from the external communication device 60 and on the external communication device identification information and the usage condition information of the home electric appliance 110 acquired from the control terminal 40, and selects software appropriate for updating the firmware of the external communication device 60. Note that the server control unit 33 stores the acquired home appliance information, external communication device identification information, and usage condition information of the home electric appliance 110 in the server storage unit 31 of the server 30.

The server control unit 33 determines the necessity of updating the firmware of the external communication device 60 based on the version information of the software corresponding to the latest firmware for the external communication device 60 stored in the server storage unit 31 and on the version information of the firmware of the external communication device 60 received from the external communication device 60, and selects software appropriate for updating the firmware of the external communication device 60.

If the server control unit 33 of the server 30 determines that the firmware of the external communication device 60 need not be updated, the server control unit 33 ends the series of firmware update processes.

On the other hand, if the server control unit 33 determines that the firmware of the external communication device 60 needs to be updated, the server control unit 33 determines the appropriate software with which the external communication device 60 needs to be updated. The appropriate software is, for example, the software corresponding to the latest firmware for the external communication device 60.

Then, the server control unit 33 transmits the update information about the external communication device 60 to the control terminal 40 via the server network communication unit 32 of the server 30 so as to notify the control terminal 40 of the presence of the software with which the firmware of the external communication device 60 needs to be updated.

The update information about the external communication device 60 is information indicating the presence of the software with which the firmware of the external communication device 60 needs to be updated. The update information about the external communication device 60 includes information on the software, determined by the server control unit 33 of the server 30, with which the firmware of the external communication device 60 needs to be updated.

Note that the server control unit 33 of the server 30 may proceed to step 3590, which will be described later, without notifying the control terminal 40, depending on the type of the determined software with which the firmware of the external communication device 60 needs to be updated.

Next, in step S570, the terminal control unit 44 of the control terminal 40 receives the update information from the server control unit 33. The terminal control unit 44 displays the update information on the display unit 42 of the control terminal 40 to notify the user that the firmware of the external communication device 60 needs to be updated, and prompts the user to determine the necessity of updating the firmware of the external communication device 60.

The user determines the necessity of updating the firmware of the external communication device 60 based on the update information displayed on the display unit 42, and inputs update necessity determination information, i.e. information indicating the necessity of update, to the input unit 41 of the control terminal 40.

If the user determines that the firmware of the external communication device 60 need not be updated, the user inputs unnecessity information, i.e. update necessity determination information indicating that the firmware of the external communication device 60 need not be updated, to the input unit 41 of the control terminal 40.

On the other hand, if the user determines that the firmware of the external communication device 60 needs to be updated, the user inputs necessity information, i.e. update necessity determination information indicating that the firmware of the external communication device 60 needs to be updated, to the input unit 41 of the control terminal 40.

In step S580, the input unit 41 of the control terminal 40 accepts the update necessity determination information input from the user, and transmits the update necessity determination information to the terminal control unit 44 of the control terminal 40. The terminal control unit 44 receives the update necessity determination information, and then transmits the update necessity determination information to the server control unit 33 of the server 30 via the terminal network communication unit 43.

Upon receiving the update necessity determination information from the control terminal 40, the server control unit 33 determines in step S590 whether to update the firmware of the external communication device 60 based on the update necessity determination information.

If the received update necessity determination information is unnecessity information, the server control unit 33 ends the series of firmware update processes.

If the received update necessity determination information is necessity information, the server control unit 33 acquires data of the appropriate software selected in step S560 from the server storage unit 31, and transmits the data to the external communication control unit 64 of the external communication device 60 via the server network communication unit 32.

The server control unit 33 may directly proceed from step S560 to step S590, in which case the server control unit 33 acquires data of the appropriate software selected in step S560 from the server storage unit 31, and transmits the data to the external communication control unit 64 of the external communication device 60 using the server network communication unit 32.

In step S600, the external communication control unit 64 receives the software data transmitted from the server control unit 33, and then stores the software data in the external communication storage unit 62 of the external communication device 60.

Next, in step S610, the external communication control unit 64 saves the currently operating firmware to the external communication storage unit 62. The external communication control unit 64 stops the currently operating firmware. Then, the external communication control unit 64 updates the firmware by using the software data for updating the firmware, which has been acquired from the server control unit 33 and stored in the external communication storage unit 62. After the firmware update is properly completed, the external communication control unit 64 deletes the previous firmware of the external communication device 60 stored in the external communication storage unit 62. This can prevent the capacity of the software stored in the external communication storage unit 62 from becoming bloated, which enables the capacity of the external communication storage unit 62 to be effectively utilized without the need to increase the capacity of the external communication storage unit 62.

If the firmware update fails, the external communication control unit 64 restarts the update. Note that if the firmware update fails, the external communication control unit 64 may rewrite the firmware with the firmware stopped before the start of the firmware update.

Next, in step S620, the external communication control unit 64 of the external communication device 60 transmits the home appliance information and the external communication device identification information to the server control unit 33 of the server 30 via the external network communication unit 63 of the external communication device 60 in the same manner as in the case of step S530. The external communication device identification information includes the version information of the firmware of the external communication device 60 that has been updated.

If the software update fails and the firmware is rewritten with the saved software that is currently operating, the external communication control unit 64 of the external communication device 60 transmits, to the server control unit 33 of the server 30, the version information of the saved software that is currently operating instead of the version information of the software that has been updated.

Next, in step S630, the server control unit 33 determines whether the firmware update of the external communication device 60 has been successful based on the information received from the external communication device 60. The server control unit 33 determines whether the firmware update of the external communication device 60 has been successful based on the version information, received from the external communication device 60, of the firmware that has been updated.

The server storage unit 31 of the server 30 retains the pre-update version information of the firmware of the external communication device 60 stored in step S560. The server control unit 33 compares the pre-update version information of the firmware of the external communication device 60 with the version information of the firmware of the external communication device 60 transmitted from the external communication device 60 in step S520, thereby determining whether the firmware update of the external communication device 60 has been successful.

If the pre-update version information of the firmware of the external communication device 60 and the version information of the firmware received from the external communication device 60 are different, the server control unit 33 of the server 30 determines that the firmware update of the external communication device 60 has been successful.

On the other hand, if the software update of the external communication device 60 fails in step S610, the server control unit 33 receives, from the external communication control unit 64, the pre-update version information of the firmware of the external communication device 60, instead of the version information of the software that has been updated. The pre-update version information of the firmware of the external communication device 60 is the same as the version information of the firmware retained in the server storage unit 31. Therefore, if the version information of the firmware retained in the server storage unit 31 and the version information of the firmware received from the external communication device 60 are the same, the server control unit 33 determines that the firmware update of the external communication device 60 has failed.

Then, the server control unit 33 transmits, to the terminal control unit 44 of the control terminal 40, information on the success or failure of the firmware update of the external communication device 60.

Next, in step S640, the terminal control unit 44 receives the information, transmitted from the server control unit 33, on the success or failure of the firmware update of the external communication device 60, and displays the success or failure of the firmware update of the external communication device 60 on the display unit 42 based on the received information to notify the user.

The device control system 300 according to the fourth embodiment can achieve the effect of reducing the storage capacity of the external communication device 60 built in the home electric appliance 110, and of updating the software of the external communication device to software specialized for the connected home electric appliance 110 in a manner that conforms to the appliance-specific usage condition.

The configurations described in the above-mentioned embodiments indicate examples of the contents of the present invention. The techniques of the embodiments can be combined with each other and with another well-known technique, and some of the configurations can be omitted or changed in a range not departing from the gist of the present invention.

The invention claimed is:

1. A device control system comprising:
a home electric appliance;
a control terminal to remotely control the home electric appliance;
a server to distribute software, the server being capable of network communication with the control terminal; and
a network communication device communicable with the home electric appliance, and operable based on the software acquired from the server by communicating with the server,
wherein
the server includes a server storage to store multiple different pieces of the software for the network communication device, the multiple different pieces of software having a one-to-one relation with different types of a plurality of home electric appliances including the home electric appliance, and, based on home appliance information, network communication device identification information, and usage condition information of the home electric appliance, the server selects the software for the network communication device corresponding to the home electric appliance from among the multiple pieces of software stored in the server storage, and transmits the software to the network communication device, the home appliance information being information with which the home electric appliance is identifiable, the network communication device identification information being information with which the network communication device is uniquely identifiable, the usage condition information being at least one of information regarding the area where the home electric appliance, the network communication device, and the control terminal are used, information regarding the language used by the user of the home electric appliance, or information regarding whether there is a function specific to the particular home electric appliance, and the network communication device updates the software for the network communication device stored in the network communication device with the software for the network communication device transmitted from the server.

2. The device control system according to claim 1, wherein, after updating the software for the network communication device, the network communication device deletes the software for the network communication device stored before the updating.

3. The device control system according to claim 2, wherein the server includes a server storage to store multiple different pieces of the software for the home electric appliance, the multiple different pieces of software having a one-to-one relation with different types of the plurality of the home electric appliances, and, based on the home appliance information and the usage condition information of the home electric appliance, the server selects the software for the home electric appliance from among the multiple different pieces of software for the plurality of the home electric appliances stored in the server storage and transmits the software to the home electric appliance via the network communication device.

4. The device control system according to claim 2, wherein the control terminal includes a terminal storage to store the software for the home electric appliance selected by the server, and transmits the software for the home electric appliance stored in the terminal storage to the home electric appliance.

5. The device control system according to claim 1, wherein the server storage stores multiple different pieces of the software for the home electric appliance, the multiple different pieces of software having a one-to-one relation with different types of the plurality of the home electric appliances, and, based on the home appliance information and the usage condition information of the home electric appliance, the server selects the software for the home electric appliance from among the multiple different pieces of software for the plurality of the home electric appliances stored in the server storage, and transmits the software to the home electric appliance via the network communication device.

6. The device control system according to claim 1, wherein the control terminal includes a terminal storage to store the software for the home electric appliance selected by the server, and transmits the software for the home electric appliance stored in the terminal storage to the home electric appliance.

7. A server to be used for a device control system, the device control system including: a home electric appliance; a control terminal to remotely control the home electric appliance; the server to distribute software, the server being capable of network communication with the control terminal; and a network communication device communicable with the home electric appliance and operable based on the software acquired from the server by communicating with the server, wherein
the server includes a server storage to store multiple different pieces of the software for the network communication device, the multiple different pieces of software having a one-to-one relation with different types of a plurality of home electric appliances including the home electric appliance, and, based on home appliance information, network communication device identification information, and usage condition information of the home electric appliance, the server selects the software for the network communication device corresponding to the home electric appliance from among the multiple pieces of software stored in the server storage, and transmits the software to the network communication device, the home appliance information being information with which the home electric appliance is identifiable, the network communication device identification information being information with which the network communication device is uniquely identifiable, the usage condition information being at least one of information regarding the area where the home electric appliance, the network communication device, and the control terminal are used, information regarding the language used by the user of the home electric appliance, or information regarding whether there is a function specific to the particular home electric appliance.

* * * * *